3,177,165
Patented Apr. 6, 1965

3,177,165
ANTIOXIDANTS COMPRISING REACTION PRODUCTS OF LIQUID RUBBERS AND AROMATIC AMINES AND COMPOSITIONS CONTAINING SAME
Roger E. Morris, Cuyahoga Falls, and James T. Gregory, Akron, Ohio, assignors to The B. F. Goodrich Company, New York, N.Y., a corporation of New York
No Drawing. Filed Jan. 26, 1961, Ser. No. 84,976
12 Claims. (Cl. 260—5)

This invention relates to novel polymeric antioxidants and novel rubbery and plastic compositions stabilized therewith and more particularly pertains to polymers containing aromatic amine groups, to novel rubbery and plastic compositions stabilized therewith and to methods for preparing said polymers, rubbery and plastic compositions.

It is well known to those skilled in the art that organic chemicals containing certain types of aromatic amine groups, such as phenyl beta-naphthyl amine, are useful for stabilizing numerous types of materials against oxygen deterioration. It is also well known that the foregoing types of antioxidants are quite mobile when they are incorporated into a rubber, plastic or other type of matrix. The aforementioned mobility or migration tendency inherent in most antioxidants has proven to be most vexing, particularly in the manufacture of light colored rubber and plastic articles and in the construction of white and colored side wall tires where troublesome staining by, and blooming of, the antioxidant continues to be a problem. It is also well known that the antioxidants used in rubber filaments employed in rubber-fabric elastic combinations tend to become extracted upon repeated washing and/or dry cleaning with the resulting deterioration of the rubber filaments by the action of oxygen. There obviously is a need for an efficient antioxidant which is immobile when incorporated into a rubber or plastic matrix. Attempts have been made in the past to prepare polymeric antioxidants by synthesis and polymerization of vinyl monomers containing functional groups having antioxidant activity. Unfortunately, vinyl monomers having such antioxidant activity generally act as polymerization inhibitors and have little or no tendency to polymerize or copolymerize to form useful antioxidant polymers.

It is therefore an object of the present invention to provide a novel class of non-violatile, non-extractable, non-migrating antioxidants. It is also an object to provide polymeric materials which not only function as non-migrating antioxidants but in some cases show superior antioxidant activity over conventional non-polymeric antioxidants. It is also an object to provide novel rubbery and plastic compositions which are stable, non-staining and resistant to oxidation. Still another object is the provision of a process for preparing novel non-migrating antioxidants. Another object is the provision of a method for preparing stable, non-staining, oxygen resistant rubbery and plastic compositions.

The foregoing and other objects are accomplished by this invention as a reading of the following description and examples will demonstrate. Numerous changes and modifications can be made in the specific embodiments disclosed herein without a departure from the spirit and scope of this invention which is specifically set out in the appended claims.

We have discovered a novel composition comprising the reaction product of a polymer of a conjugated diene and an amine having at least one amino group attached to a carbon atom in an aromatic nucleus.

The conjugated diene polymers most useful as starting materials in the preparation of the polymeric antioxidants in the present invention are homopolymers and interpolymers of conjugated diene hydrocarbons having from 4 to 8 carbon atoms such as butadiene-1,3, 2-methyl-butadiene-1,3, 1-methyl-butadiene-1,3, 2,3-dimethyl-butadiene-1,3, 2-ethyl-butadiene-1,3, 2,3-diethyl-butadiene-1,3, and the like. Most preferred in the present invention are butadiene-1,3 and 2-methyl-butadiene-1,3 (isoprene). The diene interpolymers which are most useful in the present invention are those made up of a major proportion of the diene units. Diene interpolymers of the foregoing type can be made with one or more other monomers containing a $CH_2=C<$ group. Such other monomers include the aralkenyl hydrocarbons having a $CH_2=C<$ group attached to an aryl group having from 8 to 12 carbon atoms such as styrene, alpha-methyl styrene, vinyl toluene, the vinyl xylenes, the divinyl benzenes, the trivinyl benzenes and the like; the alpha-beta unsaturated nitriles having from 3 to 6 carbon atoms such as acrylonitrile, methacrylonitrile, vinylidene cyanide, and the like; the vinyl esters having from 3 to 14 carbon atoms such as vinyl formate, vinyl acetate, vinyl propionate, vinyl laurate and vinyl benzoate and similar alpha-beta unsaturated esters such as isopropenyl acetate and the like; the alkyl esters of acrylic acid having from 4 to 15 carbon atoms such as methyl acrylate, ethyl acrylate, butyl acrylate, dodecyl acrylate and the like; the alkyl esters of methacrylic acid having from 5 to 16 carbon atoms such as methyl methacrylate, ethyl methacrylate, butyl methacrylate, 2-ethyl hexyl methacrylate, decyl methacrylate and dodecyl methacrylate.

Preferred as other monomers are styrene and acrylonitrile.

Most preferred are diene interpolymers of the aforementioned types having molecular weights in the range of from 500 to 15,000 and more preferably in the range of 700 to 12,000 wherein less than about 50% and more preferably less than about 20% of the diene units present therein have the 1,4-structure.

The amines which are most useful in the present invention are aromatic amines in which at least one amine group is attached to an aromatic carbon atom. Preferred are the aromatic secondary amines having the formula $$R-\underset{\underset{H}{|}}{N}-R'$$

wherein R and R' each represents an aromatic radical having from 6 to 18 carbon atoms. Specific amine compounds embodied herein are diphenylamine, nuclear alkylated diphenyl amines such as monooctyl diphenyl amine, dioctyl diphenyl amine wherein each phenyl group bears an octyl substituent, mono- and dinonyl diphenyl amine and the like. Most preferred in the present invention are amines of the foregoing formula wherein R and R' are selected from the class consisting of phenyl radicals and nuclear alkylated phenyl radicals wherein the alkyl group has from 1 to 12 carbon atoms.

The polymeric antioxidants embodied herein are prepared by reacting the aforementioned polymer of a conjugated diene with the aromatic amine at a temperature of from about 50° C. to about 200° C. and preferably at a temperature of from about 90 to 180° C. The reaction is facilitated with an acid catalyst and it is often desirable to use a solvent as reaction medium. Useful solvents for the foregoing reaction are hexane, benzene, carbon tetrachloride, ethylene dichloride, and the like. The reaction can also be carried out in an excess of the aforementioned aromatic amine reactant and this procedure is preferred because of the excellent soluble and workable products which result therefrom.

 Materials which catalyze the foregoing reaction and are preferred in this invention include mixed alkane sulfonic acids, the halides of boron, the halides of aluminum and the halides of tin. Generally speaking, the preferred catalysts are those commonly referred to as Friedel-Crafts catalysts. Most preferred as catalysts are aluminum chloride, and boron trifluoride. The catalyst, when used, shows greatest activity in the range of from about 0.001 to 10% by weight based on the weight of the reactants and more preferably from about 0.5 to 3% by weight based on the weight of the reactants.

The preferred polymeric antioxidants embodied herein are those containing from about 10 to 50% and more preferably 20 to 50% by weight of chemically combined aromatic amine. The amount of chemically bound aromatic amine in a given polymeric antioxidant may be determined by weight increase in the reaction, ultraviolet analysis and infrared analysis.

The polymeric antioxidants embodied herein are useful in elastomer and plastic compositions and in compositions of all types which are subject to oxygen deterioration. Among the elastomeric or rubbery materials which can be stabilized with the polymeric antioxidants embodied herein are those broadly described as natural and synthetic rubbers and more specifically as the rubbery polymers of dienes, preferably open-chain conjugated dienes having from 4 to 8 carbon atoms such as natural rubber which is essentially a polymer of isoprene, butadiene-1,3, isoprene, 2,3-dimethyl butadiene-1,3 and the like, the synthetic natural rubbers such as cis-1,4 head-to-tail polyisoprene and other polymers obtained from 1,3-dienes by means of directive polymerization, the rubbery copolymers, terpolymers and the like of these and similar conjugated dienes with at least one copolymerizable monomer such as isobutylene, styrene, acrylonitrile, methyl acrylate, ethyl acrylate, butyl acrylate, methyl methacrylate, 2-vinyl pyridine, etc. The polymeric diene rubbers generally contain at least 50% by weight of the diene and preferably contain from about 55 to 85% by weight of the diene. However, copolymers, terpolymers and other multi-component polymers containing as little as 35% or less by weight of diene can also be employed. For example, polymers of about 35% by weight of butadiene, about 35% by weight of styrene and about 30% by weight of acrylonitrile and of about 97% by weight of isobutylene and about 3% by weight of isoprene can be used. For the purposes of this invention balata, gutta percha, which are isomers of natural rubber and the like which contain available unsaturation are to be considered as rubbery materials.

Still other rubbery materials can be used such as polymers having curable acid groups obtained by polymerizing a major amount of an open-chain aliphatic conjugated diene with an olefinic unsaturated carboxylic acid, by the reaction of a polymer of a diene with a carboxyl supplying reagent preferably in the presence of a catalyst, by the copolymerization of a diene with an olefinically unsaturated copolymerizable compound hydrolyzable to form an acid group, by copolymerization of an alkyl ester of an acrylic type acid with an olefinically unsaturated carboxylic acid, the hydrolysis of an alkyl ester of acrylic acid or the copolymerization of a major amount of a monoolefin or isoolefin with a copolymerizable compound hydrolyzable to form groups containing bound —COOH groups. Still other rubbery materials can be employed such as polymers formed by the copolymerization of dienes with alkyl acrylates, by the polymerization of an alkyl acrylate with at least one other olefinically unsaturated monomer which then are hydrolyzed to obtain curable —COOH groups. In place of polymers having —COOH groups, polymers having groups such as —COOR, —COCl, —CONH$_2$, —COONH$_4$ and —COOMe, wherein the Me is a metal, and the like and which are convertible to —COOH groups by ammonolysis, hydrolysis, or similar reaction, for example, by treating such polymers with dilute mineral acids or dilute alkali can also be employed after such groups have been converted to a curable —COOH group.

Less preferred polymeric vulcanizable synthetic rubbers formed by the polymerization of an acrylic acid ester, for example, ethyl-acrylate or butylacrylate, or mixtures of an acrylic acid ester or by the copolymerization of an acrylic acid ester with a chlorine containing monomer such as a minor amount of chloroethyl vinyl ether, vinyl chloride, beta-chloroethyl acrylate or dichlorodifluoro ethylene or with acrylonitrile, ethylene or styrene can likewise be used.

Polysulfide rubbers, rubbery polyesterurethanes, and polyetherurethanes can also be stabilized with the polymeric antioxidants embodied herein. Mixtures of the foregoing rubbers can also be used.

Plastic compositions useful in blends with the polymeric antioxidants embodied in this invention include plasticized and unplasticized homopolymers and copolymers of vinyl halides such as vinyl chloride, vinyl bromide, vinyl fluoride, and the vinylidene halides. The polymeric monoolefins such as ethylene, propylene, butene-1 and the like are useful in this invention.

It is to be understood that the polymeric antioxidants embodied in this invention can be employed in mixtures of plastic and rubbery materials and that additional materials can be used in the plastic and rubbery compositions such as the conventional pigments, reinforcing agents, vulcanization agents, accelerators and the like, which are well known in the art.

The following examples illustrate the products and processes of this invention. In the examples, the amounts of the various ingredients are expressed as parts by weight unless otherwise indicated.

EXAMPLE I

A reactor equipped with mechanical stirrer, reflux condenser and nitrogen inlet was charged with 500 g. of p-monooctyl diphenyl amine and 109 g. of an alkali metal catalyzed liquid copolymer of 23% styrene and 77% butadiene-1,3 having a molecular weight of from about 8,000 to 10,000 in which at least about 50% of the butadiene units present have the 1,2-structure and the remaining 50% have the 1,4-structure as determined by infrared analysis. The mixture was stirred under a nitrogen atmosphere at 100° C. and 8 g. of anhydrous aluminum chloride were added slowly. The reaction mixture was then heated to 180° C. and maintained at this temperature for 2.5 hours with continuous stirring under nitrogen. The solution was then cooled and poured into a stirred mixture of 1 l. of methanol containing 10 ml. of concentrated hydrochloric acid. Stirring was continued for an hour. The solid product was isolated and washed with an additional liter of methanol. The tan solid product was isolated and extracted for an hour with methanol followed by drying in a vacuum oven at 60° C. for 10 hours. A yield of 210 g. of product represents a weight increase of 101 g. and shows that at least 48% by weight of p-monooctyl diphenyl amine had reacted with the polymer. Ultraviolet absorption analysis of the product also showed 48% by weight of bound monooctyl diphenyl amine.

Similarly another product was obtained which contained 40% by weight of monooctyl diphenyl amine and had a softening range of 70–80° C.

The foregoing reaction was repeated using an alkali metal catalyzed liquid polybutadiene having a molecular weight of about 1,000 and having less than about 20% of the diene units present in the 1,4-structure and the remaining units in the 1,2-structure.

EXAMPLE II

This experiment illustrates the equilibration of equimolar amounts of p,p'-dioctyl diphenyl amine and diphenyl amine followed by the reaction of the product with a low molecular weight (8,000 to 10,000) copolymer of 23% styrene and 77% butadiene-1,3 wherein no more than about 50% of the butadiene units present have the 1,4-structure and the remainder of the butadiene units have the 1,2-structure. All reactions given below were carried out under nitrogen with stirring.

To a reaction vessel were charged 249 g. of p,p'-dioctyl diphenyl amine, 106 g. of diphenyl amine and 4 g. of anhydrous aluminum chloride. The mixture was maintained at 155–160° C. for an hour. The styrene-butadiene polymer described above (55.8 g.) was added to the reaction vessel and the resulting mixture was maintained at about 180° C. for an hour and three quarters. The product was worked up as described in Example I. The dried product was found to contain 44% by weight of chemically combined p-monooctyl diphenyl amine. The solid product had a softening range of from about 87 to 100° C.

Alternatively the separate equilibration step described above can be eliminated. When the foregoing procedure was repeated with the exception that the polymer was batch charged in the reaction vessel along with the p,p'-dioctyl diphenyl amine, diphenyl amine and aluminum chloride and the reaction was carried out at 155–165° C. for three and a half hours, a product which was substantially identical with that of the above reaction was isolated.

EXAMPLE III

This example illustrates the use of a solvent in the reaction of the aromatic amine with the diene polymer. The apparatus described in Example I was used.

A mixture of 73.5 g. of p,p'-dioctyl diphenyl amine, 31.5 g. of diphenyl amine, 28.5 g. of the styrene-butadiene polymer described in Example I, 3 g. of anhydrous aluminum chloride and 100 ml. of o-dichloro-benzene was added to the reaction vessel. The reaction mixture was stirred under nitrogen for one hour and ten minutes at a temperature of from 155–170° C. The product was worked up in the manner described in Example I. A solid product containing 39% by weight of chemically bound p-monooctyl diphenyl amine resulted.

Several other runs were made by the foregoing procedure wherein the molar ratio of p,p'-dioctyl diphenyl amine to diphenyl amine was varied between 1:1 and 2:1 respectively. The products were found to contain various amounts of bound p,p'-dioctyl diphenyl amine, p-monooctyl diphenyl amine and diphenyl amine depending upon the particular molar ratio used.

When an alkali catalyzed polyisoprene having a molecular weight of about 12,000 and containing less than about 20% of the isoprene units therein in the 1,4-structure was substituted for the styrene-butadiene polymer above, similar results were obtained.

EXAMPLE IV

The apparatus described in Example I was used. The reaction vessel was charged with 169 g. of diphenyl amine and 2 g. of anhydrous aluminum chloride. This mixture was heated to 160° C. and 30.3 g. of the styrene-butadiene copolymer described in Example I were added. The resulting mixture was stirred to 160° C. in a nitrogen atmosphere for an hour. The product was worked up as described in Example I. The product was a solid softening in the range 77–91° C. containing 31% by weight of diphenyl amine as determined by ultraviolet analysis.

Similar results were obtained when a copolymer of 30% acrylonitrile and 70% of butadiene-1,3 having less than about 50% of the diene units present therein in the 1,4-configuration and having a molecular weight of 5,000 was substituted for the styrene butadiene copolymer above.

EXAMPLE V

The appaartus is described in Example I. A mixture of 150 g. of the high temperature reaction product of diphenyl amine and acetone and 25 g. of the styrene-butadiene copolymer described in Example I was prepared in the reaction vessel. The mixture was stirred and maintained at 185° C. in a nitrogen atmosphere and 1 g. of anhydrous aluminum chloride was added thereto. The heating and stirring were continued for two hours and ten minutes. The product, worked up as in Example I, contained 25% by weight of the acetone-diphenyl amine reaction product and it softened in the range of 73–93° C.

EXAMPLE VI

The reaction vessel was charged with 150 g. of phenyl beta-naphthyl amine and 25 g. of the styrene-butadiene copolymer described in Example I. The mixture was heated to 130° C. and 3 g. of anhydrous aluminum chloride were added thereto. The reaction was then carried out at 170–180° C. for 3 hours with stirring in a nitrogen atmosphere. The product which was isolated as described in Example I contained 26% phenyl beta-naphthyl amine as determined by weight increase.

EXAMPLE VII

The reaction vessel was charged with 200 g. of mono-nonyl diphenyl amine (prepared by reacting diphenyl amine and propylene trimer) and 30 g. of the styrene-butadiene copolymer described in Example I. The mixture was heated to 120° C. and 2.5 g. of anhydrous aluminum chloride were then added to the vessel. Stirring was continued at 170–180° C. under nitrogen for two hours. The product, which was worked up in the manner described in Example I, had a softening range of 50–60° C.

EXAMPLE VIII

Standard tread stocks were prepared from the following recipe:

| | |
|---|---|
| Natural rubber (pale crepe) | 100 |
| ZnO | 5.0 |
| Stearic acid | 3.0 |
| EPC carbon black | 50.0 |
| Benzothiazyl disulfide | 1.0 |
| Sulfur | 3.0 |
| Antioxidant | Variable |

The resulting stocks were cured at 284° F. for 50 and 80 minute periods. The vulcanizates were aged in oxygen at 100° C. for 24 and 48 hour periods. Tensiles before and after aging were determined and the percent tensile retention was calculated for each sample. Similarly the De Mattia flexure test was run on each sample after it had been aged in oxygen at 100° C. for 24 hours. The results of the foregoing tests are given in the following table. The term "phr." means "parts per hundred of rubber."

| Antioxidant | Percent Tensile Retention — Aged — Cured | | | | De Mattia Flexure |
|---|---|---|---|---|---|
| | 24 hrs. | | 48 hrs. | | |
| | 50' | 80' | 50' | 80' | |
| Product of Example VII: | | | | | |
| 1.0 phr | 87 | 85 | 76 | 70 | 150,000-10 |
| 3.0 phr | 94 | 91 | 89 | 83 | 215,000-10 |
| 5.0 phr | 96 | 94 | 95 | 87 | 225,000-9 |
| 10.0 phr | 103 | 97 | 100 | 91 | 225,000-8.5 |
| Product of Example II: | | | | | |
| 1.0 phr | 93 | 83 | 82 | 65 | 137,500-9.5 |
| 2.0 phr | 96 | 92 | 80 | 70 | 162,500-9 |
| 3.0 phr | 96 | 84 | 83 | 68 | 162,500-9 |
| 6.0 phr | 96 | 95 | 84 | 80 | 175,000-9.5 |
| Product of Example V: | | | | | |
| 1.0 phr | 83 | 87 | 85 | 78 | 137,500-9.5 |
| 2.0 phr | 90 | 92 | 88 | 88 | 156,250-8.2 |
| 3.0 phr | 100 | 94 | 100 | 90 | 193,750-8 |
| None | 73 | 60 | 47 | 42 | 75,000-10 |
| Styrene-butadiene copolymer described in Example I: | | | | | |
| 3.0 phr | 77 | 65 | 58 | 45 | 160,000-10 |

EXAMPLE IX

Polymeric and non-polymeric antioxidants were tested in a white stock for their staining characteristics. The following white rubber recipe was used:

| | |
|---|---|
| Butyl rubber (non-staining) | 100 |
| ZnO | 20 |
| $TiO_2$ | 20 |
| Silica | 40 |
| Stearic acid | 2 |
| Ultramarine blue | 0.2 |
| Tetramethyl thiuram disulfide | 1.0 |
| Mercapto benzothiazole | 1.0 |
| Sulfur | 1.5 |
| Antioxidant | Variable |

Stocks prepared from this recipe containing the proportions of antioxidant shown in the graph were cured in standard molds at 293° F. for 30 minutes after first being thoroughly mixed at 215° F. or below the vulcanized white samples having the dimensions 1″ x 1″ x 0.06″ were exposed to an illuminated Hanovia ultraviolet lamp at 70° C. for 427 hours and were then examined with a reflectometer (Photovolt Model 610 blue light). The change in reflectance (based on a similarly exposed control sample containing no antioxidant) versus antioxidant level was determined. When 2 phr. of the product of Example II was used as antioxidant in this test a change in reflectance of 20 was observed whereas the use of 1 phr. of a conventional antioxidant (a mixture of monooctyl and dioctyl diphenyl amine) as antioxidant caused a change in reflectance of 55. The use of as little as ½ phr. of the aforementioned conventional antioxidant gave a change in reflectance of 40.

EXAMPLE X

The diffusion of various antioxidants from a black rubber stock through an adjacent white rubber stock was studied and the advantage of using a polymeric antioxidant of the type embodied herein becomes quite evident from a study of the results. The following black recipe was used:

| | |
|---|---|
| Cold SBR (23.5% styrene, 76.5% butadiene-1,3) | 77.5 |
| Natural rubber | 22.5 |
| ZnO | 3.0 |
| Carbon black (FEF) | 30.0 |
| Light mineral oil (processing aid) | 4.0 |
| Non-oxidizing rosin | 3.0 |
| Benzothiazyl disulfide (MBTS) | 2.0 |
| Sulfur | 3.0 |
| Antioxidant | Variable |

Similarly a white stock (that given in Example IX containing no antioxidant) was prepared. The black stock was preformed at 212° F. for 15 minutes in a standard mold. The white stock was also preformed and partially cured at 293° F. for 30 minutes in a standard mold. The preformed black and white stocks were then cured together to form a laminate at 293° F. for 30 minutes. The resulting laminate consisted of a 0.230″ thickness of black rubber and a 0.020″ thickness of white rubber. The laminates were then exposed (white side up) simultaneously to an illuminated Hanovia ultraviolet lamp and 70° C. heat for "equilibrium stain" time of 427 hours. The white side of each exposed laminate was then examined with the Photovolt reflectometer and the reflectance drop was noted. The reflectance drop is the difference in reflectance of a control sample containing no antioxidant in either the black or white portion and the equilibrium reflectance of the sample tested. The results of the foregoing test are given below.

| Antioxidant | Level, phr. | Reflectance drop |
|---|---|---|
| None (control) | | 0 |
| Product of Example IV | 3.0 | 2.5 |
| Mixture of p-monooctyl diphenyl amine and p,p'-dioctyl diphenyl amine (conventional rubber antioxidant) | 3.0 | 45.0 |

EXAMPLE XI

Antioxidants were incorporated into polyethylene with and without carbon black and the induction periods were measured. The induction period is the time in hours required for the absorption of 10 ml. of oxygen per gram of sample. The tests were carried out in a standard oxygen absorption apparatus. Concentrations of the antioxidant and carbon black are expressed in parts per hundred of polyethylene.

| Antioxidant | Antioxidant Concentration | Concentration of Kosmos BB Black | Induction Period |
|---|---|---|---|
| Product of Example II | 0.1 | 0 | 111 |
| Product of Example II | 0.1 | 3.0 | 180 |
| ⌬—NH—⌬—NH—⌬ | 0.1 | 0 | >250 |
| ⌬—NH—⌬—NH—⌬ | 0.1 | 3.0 | 50 |

It is obvious that the polymeric antioxidant is much more effective in polyethylene in the presence of carbon black than is a well-known conventional antioxidant as shown above.

In accordance with the teaching of U.S. Patent No. 1,852,295, Example 3, 10 g. of catechol and 20 g. of diphenylamine hydrochloride were milled into 100 g. of pale crepe rubber. The resulting mixture was placed in an oven at 100° C. for 20 hours. At the end of this period the mixture was black and when cool, quite hard. In order to purify the product 300 ml. of chloroform were added. Instead of dissolving (as the products embodied in the present invention do) the product swelled. It is obvious that the product was vulcanized and cyclized. This material had little or no antioxidant activity.

We claim:

1. An antioxidant for rubbery and plastic materials which by virtue of its polymeric nature is essentially immobile when incorporated in a matrix thereof, said antioxidant being the reaction product of reactants consisting of
 (a) a diene polymer selected from the class consisting of:
  (1) homopolymers of conjugated diene hydrocarbons having from 4 to 8 carbon atoms, and
  (2) copolymers of more than 50% by weight of a conjugated diene hydrocarbon having from 4 to 8 carbon atoms with a lesser amount of a copolymerizable compound containing the $CH_2{=}C{<}$group
   said homopolymers (1) and copolymers (2) being characterized by:
    (i) having a molecular weight in the range of 500 to 15,000 and
    (ii) having less than 50% of the diene hydrocarbon units therein present in the 1,4 configuration, and
 (b) an aromatic amine of the formula

wherein each of R and R' is an aromatic hydrocarbon radical of 6 to 18 carbon atoms having its connecting valence on a nuclear carbon atom,
said reaction product containing from 10 to 50 parts by weight of (b) chemically combined with 100 parts by weight of (a).

2. An antioxidant in accordance with claim 1 wherein (a) is a liquid polybutadiene in which more than 80% of the butadiene units are present in the 1,2 structure.

3. An antioxidant in accordance with claim 2 wherein (b) is p-monooctyl diphenyl amine.

4. An antioxidant in accordance with claim 1 wherein (a) is a liquid polyisoprene in which more than 80% of the isoprene units are present in the 3,4 structure.

5. An antioxidant in accordance with claim 4 wherein (b) is p-monooctyl diphenyl amine.

6. An antioxidant in accordance with claim 1 wherein (a) is a liquid copolymer of about 77% butadiene and about 23% styrene.

7. An antioxidant in accordance with claim 6 wherein (b) is p-monooctyl diphenyl amine.

8. An antioxidant in accordance with claim 6 wherein (b) is phenyl beta-naphthylamine.

9. An antioxidant in accordance with claim 6 wherein (b) is diphenyl amine.

10. The method of converting a liquid diene polymer as defined in (a) of claim 1 into a solid polymeric antioxidant which comprises dissolving said diene polymer in an excess of a liquid aromatic amine as defined in (b) of claim 1, adding to the resulting solution from 0.001 to 10% by weight based on the weight of reactants of an acid catalyst selected from the class consisting of alkane sulfonic acids, boron halides, aluminum halides, and tin halides, heating said solution containing said catalyst to a temperature of 50 to 200° C. for a time sufficient to effect reaction of about 10 to 50 parts by weight of said liquid phenolic compound with about 100 parts by weight of said liquid diene polymer and thereby form a solid product, and separating said solid product from the reaction medium.

11. A composition of matter comprising a rubbery material selected from the class consisting of:
 natural and synthetic rubbery homopolymers of isoprene
 rubbery homopolymers of butadiene
 rubbery copolymers of butadiene with styrene
 rubbery copolymers of isobutylene with isoprene
and, as a flex-resisting, non-staining, non-migrating antioxidant therefor, from 0.1 to 10 parts by weight based on 100 parts by weight of said rubbery material of antioxidant as defined in claim 1.

12. A composition of matter comprising about 100 parts by weight of polyethylene, about 3 parts by weight of carbon black and, as a non-migrating antioxidant for said polyethylene, about 0.1 to 5 parts by weight of antioxidant as defined in claim 1.

References Cited by the Examiner
UNITED STATES PATENTS

| | | | |
|---|---|---|---|
| 2,158,530 | 5/39 | Williams | 260—768 |
| 2,317,385 | 4/43 | Koch et al. | 260—85.1 |
| 2,476,822 | 7/49 | Miller | 260—85.1 |
| 2,525,655 | 10/50 | D'Ianni | 260—768 |
| 2,809,372 | 10/57 | Frederick et al. | 260—5 |
| 2,816,286 | 12/57 | Harvey et al. | 260—5 |
| 2,829,131 | 4/58 | Greenspan et al. | 260—85.1 |
| 2,892,004 | 6/59 | Bartl et al. | 260—768 |
| 2,965,624 | 12/60 | Anderson | 260—94.2 |

MURRAY TILLMAN, *Primary Examiner.*

D. ARNOLD, LEON J. BERCOVITZ, WILLIAM H. SHORT, *Examiners.*